(12) United States Patent
Matsuta et al.

(10) Patent No.: US 11,374,281 B2
(45) Date of Patent: Jun. 28, 2022

(54) BATTERY MODULE

(71) Applicant: Toyota Jidosha Kabushiki Kaisha, Toyota Aichi-ken (JP)

(72) Inventors: Takahisa Matsuta, Okazaki (JP); Ayumi Iijima, Toyota (JP); Toru Abe, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 16/941,052

(22) Filed: Jul. 28, 2020

(65) Prior Publication Data
US 2021/0083242 A1    Mar. 18, 2021

(30) Foreign Application Priority Data
Sep. 13, 2019 (JP) .............................. JP2019-167339

(51) Int. Cl.
| | |
|---|---|
| H01M 10/04 | (2006.01) |
| H01M 10/48 | (2006.01) |
| H01M 10/6557 | (2014.01) |
| H01M 10/6568 | (2014.01) |
| H01M 10/625 | (2014.01) |
| H01M 50/20 | (2021.01) |
| H01M 10/613 | (2014.01) |

(52) U.S. Cl.
CPC ....... *H01M 50/20* (2021.01); *H01M 10/0481* (2013.01); *H01M 10/482* (2013.01); *H01M 10/486* (2013.01); *H01M 10/613* (2015.04); *H01M 10/625* (2015.04); *H01M 10/6557* (2015.04); *H01M 10/6568* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2012/0156537 A1* | 6/2012 | Meintschel | B60L 58/26 |
| | | | 429/99 |
| 2012/0156541 A1 | 6/2012 | Sohn | |

(Continued)

FOREIGN PATENT DOCUMENTS

| | | |
|---|---|---|
| JP | 2013-020891 A | 1/2013 |
| KR | 10-2012-0006973 A | 1/2012 |
| KR | 10-2012-0070274 A | 6/2012 |

OTHER PUBLICATIONS

Machine translation of JP2013-020891 (Year: 2013).*

*Primary Examiner* — Lisa S Park

(74) *Attorney, Agent, or Firm* — Dinsmore & Shohl LLP

(57) ABSTRACT

A battery module disclosed herein includes a plurality of submodules, and a housing that houses the submodules. Each of the plurality of submodules includes: a cell group in which single cells are arranged; and a constraining member exerting a constraining pressure in an arrangement direction of the plurality of single cells. Inside the housing of the battery module disclosed herein, there is a region where the temperature is likely to be relatively low when charging-discharging of the plurality of submodules is performed, and among the plurality of submodules, a submodule arranged in the region where the temperature is likely to be low has a lower constraining pressure than those in the other submodules.

11 Claims, 5 Drawing Sheets

(56) References Cited

U.S. PATENT DOCUMENTS

2012/0308860 A1* 12/2012 Pizzurro ............. H01M 10/656
                                                    429/89
2014/0117762 A1*  5/2014 Yamauchi ........... H01M 50/209
                                                    307/48

* cited by examiner

BATTERY MODULE

CROSS-REFERENCE TO RELATED APPLICATION

This application claims priority to Japanese Patent Application No. 2019-167339 filed on Sep. 13, 2019, which is incorporated herein by reference in its entirety including the specification, drawings, and abstract.

BACKGROUND

1. Technical Field

The present disclosure relates to a battery module.

2. Description of Related Art

Japanese Patent Application Publication No. 2013-20891 discloses a constraining structure including: a constraining band to constrain the outer periphery of an assembled battery formed by stacking a plurality of battery cells while pressing the outer periphery of the assembled battery in the stacking direction of the battery cells; a constraining force variable device provided at a joint end of the constraining band; a temperature detector for detecting the temperature of the assembled battery; and a control unit for adjusting the constraining force of the constraining force variable device depending on the output from the temperature detector.

SUMMARY

In the meantime, in the field of battery modules in recent years, there has been required a technology that can exhibit a suitable high-rate resistance as a whole battery module because of an increasing demand for performance that restrains increase in internal resistance during a high-rate charging-discharging (hereinafter, referred to as "high-rate resistance"). The present disclosure has been made for satisfying such a demand, and an object of the present disclosure is to provide a battery module that exerts a high-rate resistance.

In order to achieve the above object, the present disclosure provides a battery module having the following configuration.

A battery module disclosed herein includes: a plurality of submodules; and a housing that houses the plurality of submodules at respective predetermined positions. The plurality of submodules includes: a cell group in which single cells each having a pair of flat surfaces facing each other are arranged such that the flat surfaces of adjacent single cells face each other; and a constraining member that exerts a constraining pressure in a direction in which the plurality of single cells is arranged so as to constrain the cell group. Inside the housing of the battery module disclosed herein, there is a region where a temperature is likely to be relatively low when charging-discharging of the plurality of submodules is carried out, and among the plurality of submodules, a submodule arranged in the region where the temperature is likely to be low has a lower constraining pressure of the constraining member than constraining pressures in the other submodules.

The battery module disclosed herein is configured by housing the plurality of submodules inside the housing, and each of the submodules individually includes a constraining member. Hence, unlike the related art in which a uniform constraining pressure is applied to all of the plurality of single cells, the constraining pressure can be adjusted in submodule units. In addition, the battery module disclosed herein is configured such that the submodule arranged in the region where the temperature is likely to be lower has a lower constraining pressure than those in the other submodules. With this configuration, the high-rate resistance can be improved by lowering the constraining pressures on the low-temperature single cells in which the high-rate resistance is likely to be low; therefore, the high-rate resistance of each single cell configuring the battery module is made uniform at a high level. As a result, a battery module exerting a high-rate resistance as a whole can be built up.

According to one aspect of the battery module disclosed herein, inside the housing, there is a region where the temperature is likely to be relatively high when charging-discharging of the plurality of submodules is performed; and among the plurality of submodules, a submodule arranged in the region where the temperature is likely to be high has a higher constraining pressure of the constraining member than constraining pressures in the other submodules. This configuration makes it possible to make the high-rate resistance of each single cell configuring the battery module more uniform; therefore, it is possible to easily build up a battery module exerting a high-rate resistance as a whole.

According to one aspect of the battery module disclosed herein, the battery module further includes a constraining pressure changing mechanism that individually changes constraining pressures of the constraining member for the plurality of submodules. With this configuration, the constraining pressures in the submodules can be individually changed according to the usage situation; therefore, it is possible to more easily obtain the battery module exerting a high-rate resistance as a whole.

In an aspect including the above constraining pressure changing mechanism, a temperature sensor that measures a temperature inside the housing; and a control unit that controls the constraining pressure changing mechanism based on measurement results of the temperature sensor may be provided.

This configuration allows an immediate change of the constraining pressure in each submodule in response to a change in the temperature distribution inside the housing, and thus the high-rate resistance of the entire battery module can be more appropriately improved.

In the aspect including the above control unit, distribution information indicating a tendency of a temperature distribution inside the housing may be recorded in the control unit; and the control unit may control the constraining pressure changing mechanism based on the measurement results of the temperature sensor and the distribution information.

With this configuration, it is possible to more easily adjust the constraining pressure based on the temperature information. Further, in the present aspect, even when the number of temperature sensors is small, the constraining pressure in each submodule can be accurately adjusted; therefore, it is also possible to contribute to reduction in manufacturing cost by reducing the number of parts.

In the aspect in which the distribution information is recorded in the above control unit, the temperature sensors may be attached to a region where the temperature is likely to be the highest inside the housing and to a region where the temperature is likely to be the lowest inside the housing.

Thus, a more accurate temperature distribution can be obtained by referring to the temperature information on the high-temperature region, the temperature information on the low-temperature region, and the distribution information.

In the aspect including the above control unit, the temperature sensor may be attached to each of the plurality of submodules.

According to the present aspect, a particularly accurate temperature distribution can be obtained.

According to one aspect of the battery module disclosed herein, the constraining member includes a constraining band that tightens and constrains the plurality of cells; and the submodule arranged in a region where the temperature is likely to be low has a lower tightening pressure of the constraining band than tightening pressures in the other submodules.

An example embodiment for lowering the constraining pressure in the submodule in the low-temperature region than those in the other submodules includes lowering the tightening pressure of the constraining band. According to the present aspect, the high-rate resistance of a plurality of single cells can be easily made uniform.

According to one aspect of the battery module disclosed herein, the submodule arranged in the region where the temperature is likely to be low has a larger space among the single cells than spaces among the single cells in the other submodules.

When the space between the constrained single cells is increased, the constraining pressure in the submodule decreases, and thus by increasing the space between the single cells of the submodule arranged in the low-temperature region, the high-rate resistance of a plurality of single cells can be made uniform.

According to one aspect of the battery module disclosed herein, each of the plurality of submodules includes a buffer plate constrained together with the plurality of cells by the constraining member; and the submodule arranged in the region where the temperature is likely to be low has a thinner thickness of the buffer plate than thicknesses of the buffer plates in the other submodules.

As in the present aspect, also in the case in which the thickness of the buffer plate in the submodule arranged in the low-temperature region is made thinner than those in the other submodules, the high-rate resistance of the plurality of single cells can be made uniform.

According to one aspect of the battery module disclosed herein, the battery module includes: a cooling path formed inside the housing so as to be adjacent to the plurality of submodules; an inlet port supplying a coolant to the cooling path from the outside of the housing; and an outlet port discharging the coolant from the cooling path to the outside of the housing.

In order to prevent thermal runaway of the single cells due to an excessive temperature rise, a cooling path for supplying a coolant (for example, air or water outside the housing) may be formed inside the housing of the battery module in some cases. In a battery module provided with such a cooling path, the temperature of the single cells disposed near the cooling path (particularly, an inlet port) tends to be low, so that the temperature distribution inside the housing tends to vary. Therefore, the technology disclosed herein can be particularly suitably used for a battery module having a cooling path inside a housing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
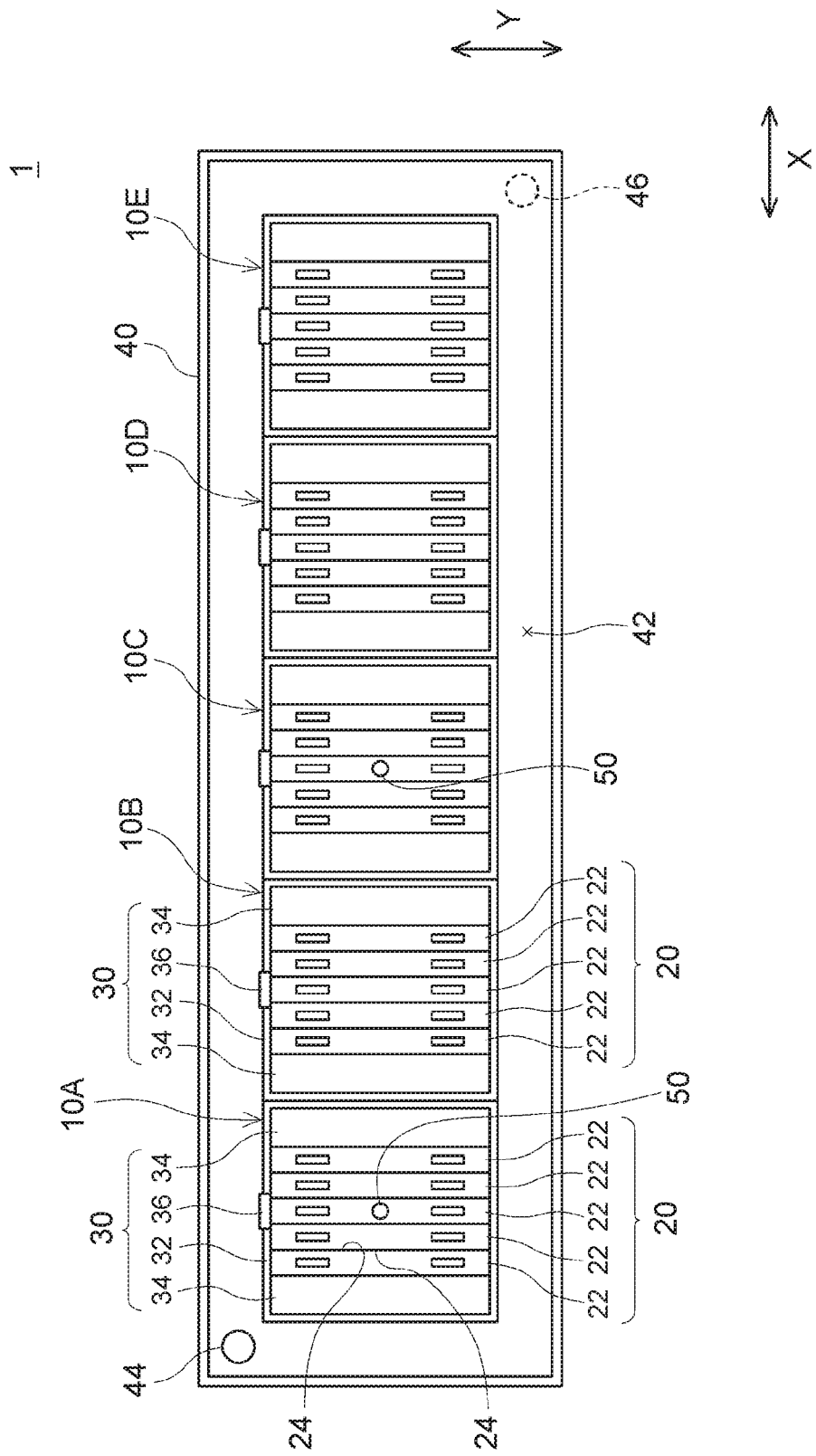
FIG. 1 is a plan view schematically showing a battery module according to one embodiment of the present disclosure.

Hereinafter, a battery module according to one embodiment of the present disclosure will be described. In the following description, the same reference numerals are added to members and portions having the same operation in each drawing. Note that the dimensional relationships (length, width, thickness, etc.) in each drawing do not reflect actual dimensional relationships. In addition, matters other than matters specifically mentioned in the present specification and necessary for practicing the present disclosure (for example, the configuration and manufacturing method of an electrode body and an electrolytic solution) can be grasped as design matters for those skilled in the art based on the related art in the relevant field.

1. First Embodiment

Figure 2:
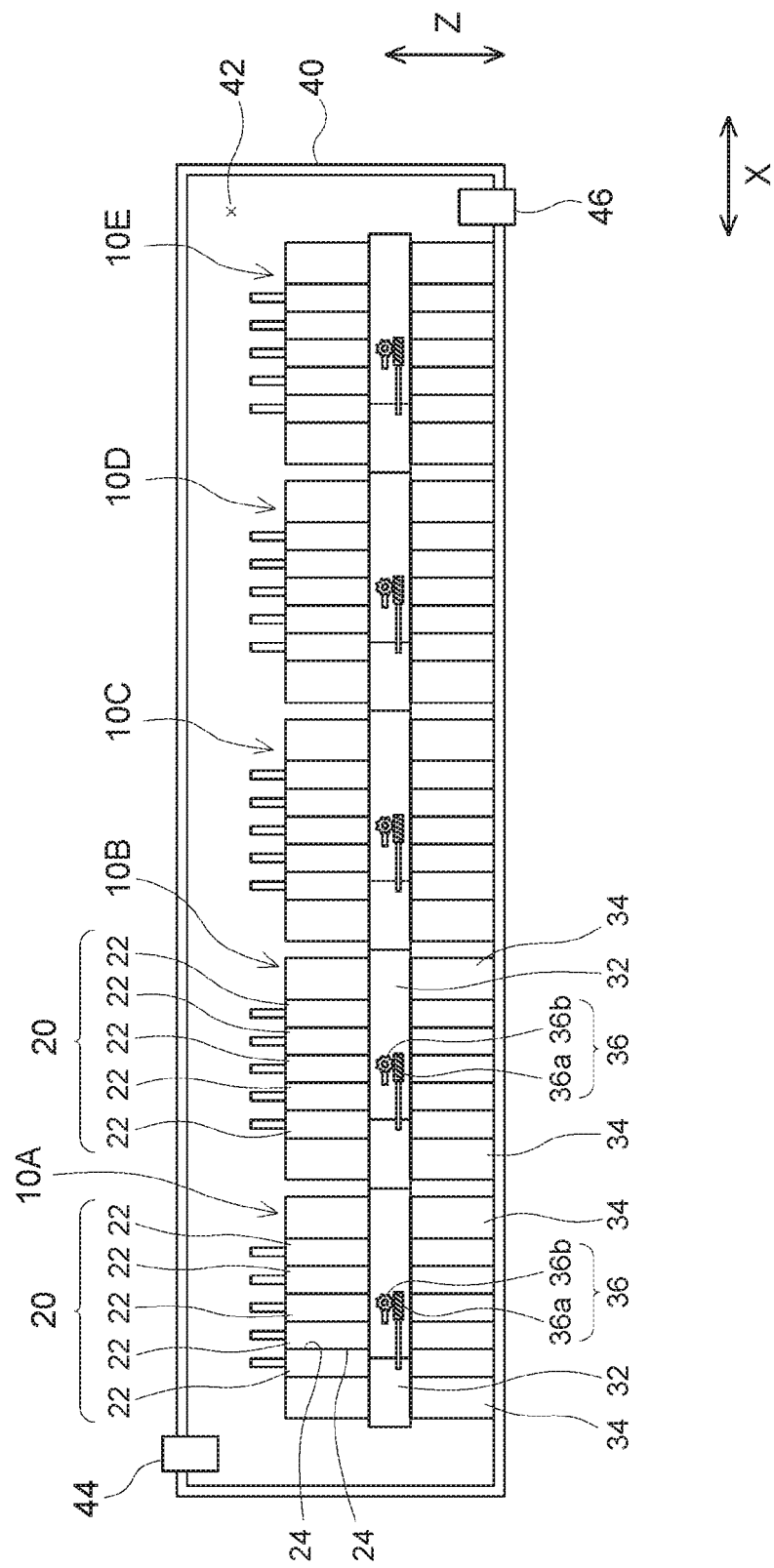
FIG. 2 is a side view schematically showing a battery module according to one embodiment of the present disclosure.
Figure 3:
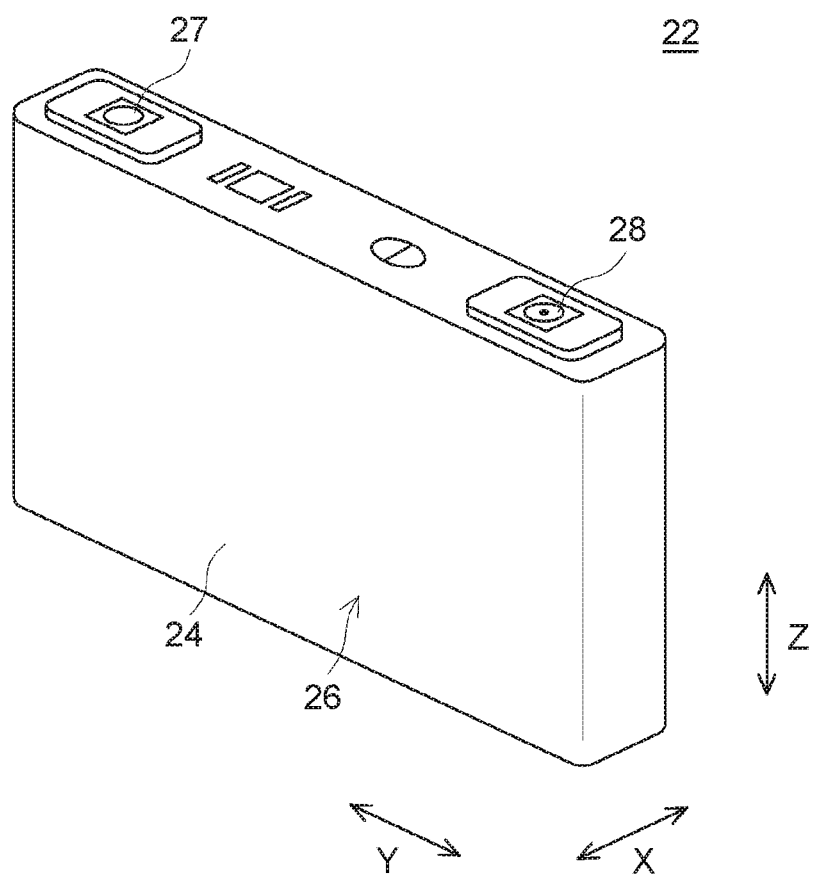
FIG. 3 is a perspective view schematically showing a single cell in one embodiment of the present disclosure.

FIG. 1 is a plan view schematically showing a battery module according to the present embodiment. FIG. 2 is a side view schematically showing the battery module according to the present embodiment. FIG. 3 is a perspective view schematically showing a single cell in the present embodiment. Hereinafter, a battery module 1 according to the present embodiment will be described with reference to FIG. 1 to FIG. 3.

As shown in FIG. 1 and FIG. 2, the battery module 1 according to the present embodiment includes a plurality of submodules 10A to 10E and a housing 40 that houses the plurality of submodules 10A to 10E at respective predetermined positions. Hereinafter, the structure of the battery module 1 according to the present embodiment will be described.

(1) Submodules

The battery module 1 according to the present embodiment has a plurality of submodules 10A to 10E. The battery module 1 shown in FIG. 1 and FIG. 2 has five submodules 10A to 10E, but the number of submodules included in the battery module is not particularly limited, and can be appropriately increased or decreased in consideration of the performance of the intended battery module. As an example, the number of submodules is about two to fifteen. In addition, as the number of submodules (the dividing number of the battery module) with respect to the total number of single cells existing in the battery module increases, it tends to become easier to build up a battery module exhibiting a high-rate resistance as a whole. Each of the plurality of submodules 10A to 10E includes a cell group 20 and a constraining member 30.

(a) Cell Group

The cell group 20 is formed by arranging single cells 22 each having a pair of flat surfaces 24 facing each other such that the flat surfaces 24 of the adjacent single cells 22 face each other. Each of the single cells 22 configuring the cell group 20 has the pair of flat surfaces 24 facing each other. Specifically, as shown in FIG. 3, each single cell 22 in the present embodiment is a square cell configured by accommodating a power generation element (not shown) including an electrode body, an electrolyte solution, and others in a flat rectangular battery case 26. The battery case 26 can be formed of a material having a predetermined rigidity (for example, aluminum steel or the like). Further, as the power generation element accommodated inside the battery case 26, any power generation element that can be used in a rechargeable battery of this type can be used without particular limitation, and is not intended to limit the technology disclosed herein; thus, detailed description thereof will be omitted. A positive terminal 27 and a negative terminal 28 are formed on an upper surface of the battery case 26. Although not shown in FIG. 1 and FIG. 2, in each single cell 22 included in the battery module 1, the positive terminal 27 and the negative terminal 28 of each of the adjacent cells are electrically connected by a connecting member such as a bus bar.

Each of the submodules 10A to 10D includes a cell group 20 including a plurality of single cells 22 arranged such that the respective flat surfaces 24 of each of the adjacent single cells 22 face each other. In this specification, the direction in which the plurality of single cells 22 are arranged is referred to as an "arrangement direction X". In FIG. 1 to FIG. 3, a symbol Y indicates a "depth direction", and a symbol Z indicates a "height direction". In FIG. 1 and FIG. 2, the left side is referred to as the "upstream in the arrangement direction X", and the right side is referred to as the "downstream in the arrangement direction X". Note that the names of these directions are defined for convenience of description, and are not intended to limit the arrangement direction of the battery module 1 or the flow of coolant or current thereof. In the battery module 1 according to the present embodiment, each cell group 20 is configured by five single cells 22, but the number of single cells configuring the cell group is not particularly limited, and can be appropriately increased or decreased in consideration of the performance of the intended battery module. For example, the number of single cells configuring each cell group can be set to about 20 to 30. In addition, the number of single cells in each of the plurality of submodules may be the same or different.

(b) Constraining Member

The constraining member 30 is a member that constrains the cell group 20 by applying a constraining pressure in the direction (arrangement direction X) in which the plurality of single cells 22 is arranged. The constraining member 30 can prevent displacement from occurring among the single cells 22. Note that the constraining member 30 in the present embodiment includes constraining bands 32 each of which tightens and constrains the plurality of single cells 22. Further, the constraining member 30 includes a pair of constraining plates 34 arranged so as to sandwich the cell group 20 therebetween. By tightening the constraining band 32 with the cell group 20 sandwiched between the constraining plates 34, the constraining pressure can be uniformly applied to the respective flat surfaces 24 of the single cells 22.

Further, the constraining member 30 in the present embodiment includes a constraining pressure changing mechanism that individually changes the constraining pressures of the constraining member 30 of the plurality of submodules 10A to 10E from outside the housing 40. Thus, the constraining pressures of the submodules 10A to 10E can be individually changed depending on the change in temperature inside the housing 40 due to usage of the battery module 1. A worm gear 36 as shown in FIG. 2 is an example of the constraining pressure changing mechanism. The worm gear 36 includes a worm 36a attached so as to bridge both ends of each constraining band 32, and a worm wheel 36b which is a gear meshing with the worm 36a. In this constraining pressure changing mechanism, the worm 36a is moved forward and backward in the arrangement direction X by rotating the worm wheel 36b, to thereby change the tightening pressure of the constraining band 32.

(2) Housing

The housing 40 is a member that houses the plurality of submodules 10A to 10E at the respective predetermined positions. The housing 40 may be a protective member that protects the submodules 10A to 10E from an external impact. In some embodiments, the battery module mounted in a vehicle is lightweight. Regarding this viewpoint, the housing 40 may be configured of a highly rigid material such as aluminum steel. The shape of the housing 40 is not particularly limited as long as this can house the submodules 10A to 10E. For example, as shown in FIG. 1 and FIG. 2, the substantially rectangular parallelepiped housing 40 which is slightly larger than the submodules 10A to 10E arranged in the arrangement direction X is used.

The battery module 1 shown in FIG. 1 and FIG. 2 includes: a cooling path 42 formed inside the housing 40 so as to be adjacent to the plurality of submodules 10A to 10E; an inlet port 44 for supplying a coolant from the outside of the housing 40 into the cooling path 42; and an outlet port 46 for discharging the coolant from the cooling path 42 to the outside of the housing 40. The battery module 1 according to the present embodiment is an air-cooled battery module using air outside the housing 40, as the above coolant. Specifically, a gap between the housing 40 and the submodules 10A to 10E functions as the cooling path 42, and the inlet port 44 and the outlet port 46 are formed in the housing 40 so as to communicate with this gap (the cooling path 42). A fan (not shown) for introducing air in the outside into the inside of the housing 40 is attached to the inlet port 44. This configuration allows the housing 40 to be supplied with low-temperature air outside the housing 40, and the air is discharged from the outlet port 46 after passing through the cooling path 42 while cooling the single cells 22. Such an air-cooling type battery module 1 can appropriately cool the single cells 22 at low cost.

According to the studies conducted by the present inventors, inside the housing 40 of the battery module 1, there occurs a region where the temperature is likely to be relatively low when charging-discharging is carried out on the plurality of submodules 10A to 10E. Specifically, when the submodules 10A to 10E generate heat due to the charge-discharge, the adjacent submodules heat each other. When the charging-discharging are performed in a high-temperature environment, the submodules generate heat more easily, and thus the temperature thereof increases up to a higher temperature more easily. Such chain-reaction heating is likely to occur particularly in the submodules 10B to 10D arranged at the center in the arrangement direction X. For this reason, in the battery module 1 according to the present embodiment, the region near the center in the arrangement direction X is a "region that tends to have a relatively high temperature (high-temperature region)". On the other hand, at the both ends in the arrangement direction X, the chain-reaction heating between the submodules is unlikely to occur, and thus these are a "region where the temperature is likely to be relatively low (low-temperature region)". In addition, in the present embodiment, since the inlet port 44 supplied with the coolant (air outside the housing 40) is formed on the upstream side in the arrangement direction X, the most upstream submodule 10A in the arrangement direction X tends to have a lowest temperature. That is, in the inside of the housing 40 of the battery module 1 according to the present embodiment, there may easily occur such a temperature distribution that the center in the arrangement direction X has a highest temperature, the downstream side in the arrangement direction X has a next highest temperature, and the upstream side in the arrangement direction X has a lowest temperature.

(3) Constraining Pressure Control

In the battery module 1 according to the present embodiment, it is configured that among the plurality of submodules 10A to 10E, the submodule 10A arranged in the region where the temperature is likely to be low has a lower constraining pressure of the constraining member 30 than those of the other submodules 10B to 10E. This configuration allows the plurality of single cells 22 to have a uniform high-rate resistance at a high level, so that the battery module 1 as a whole can exert a suitable high-rate resistance. The reason why such an effect is obtained will be described hereinafter.

First, in the related art, for the purpose of maintaining the charging-discharging capacity, and the like, the cooling is promoted by reducing the constraining pressure when the temperature of the single cell becomes high. However, as a result of various experiments and studies conducted by the present inventors, it is found that the high-rate resistance tends to decrease as the temperature of the single cell decreases, and that the high-rate resistance tends to increase as the constraining pressure decreases. Based on this finding, from the viewpoint of enhancement of the high-rate resistance, it is expected in some embodiments to reduce the constraining pressure when the temperature of the single cell becomes low.

However, even if the constraining pressure on the single cell is reduced based on the above finding, the high-rate resistance varies among the plurality of single cells, which makes it difficult to obtain a suitable high-rate resistance for the entire battery module. Specifically, as described above, variation in temperature occurs inside the housing of the battery module; therefore, if the constraining pressure is set uniform through all the single cells, the high-rate resistance of the single cells arranged in the low-temperature region becomes relatively low. In this case, when the charging-discharging of the entire battery module is controlled based on the high-rate resistance of the single cells in the low-temperature region, the higher high-rate resistance that the single cells in the high-temperature region have cannot be fully utilized. On the other hand, when the above control on the charging-discharging is carried out based on the high-rate resistance of the single cells in the high-temperature region, a high voltage is applied to the low-temperature single cells, which may result in increase of a high-rate degradation. As described above, in the battery module in which variation in temperature inside the housing occurs, the entire high-rate resistance may be limited by the high-rate resistance of the low-temperature single cells.

To the contrary, in the present embodiment, the constraining pressure of the submodule 10A in the low-temperature region is set lower than those of the other submodules 10B to 10E such that the high-rate resistance of the single cells 22 of the submodule 10A in the low-temperature region is increased to be higher than those of the submodules 10B to 10E in the other regions. Accordingly, it is possible to uniform the high-rate resistance of each of the plurality of single cells 22 at a high level, so that the battery module 1 as a whole can exhibit a suitable high-rate resistance.

It has been confirmed by the experiments conducted by the present inventors that for example, in the case of using a general lithium-ion rechargeable battery as each single cell 22, when the temperature around the single cell 22 increases from 25° C. to 35° C., the high-rate resistance is improved by 1.15 times. On the other hand, it has been confirmed that when the constraining pressure of the constraining member 30 is reduced from 5.9 kN to 0.64 kN, the high-rate resistance is improved by 1.33 times. At this time, if the temperature around the most upstream submodule 10A tends to be lower by about 5° C. than the temperature around the submodule 10C at the center, it may be desirable to reduce the constraining pressure of the submodule 10A on the most upstream side down to between 1 kN and 2 kN (for example, about 1.83 kN), and to set the constraining pressure of the submodule 10C at the center to 5.9 kN. Thereby, the high-rate resistance of the submodule 10A disposed in the low-temperature region can be enhanced to a level substantially equal to that of the submodule 10C disposed in the high-temperature region.

In addition, the battery module 1 according to the present embodiment is configured such that the constraining pressure can be immediately adjusted in response to a change in temperature distribution inside the housing 40. Specifically, the battery module 1 includes a temperature sensor 50 that measures the temperature inside the housing 40, and a control unit (not shown) that controls the constraining pressure changing mechanism (the worm gear 36) based on the measurement result of the temperature sensor 50.

As the temperature sensor 50, any sensor can be used without any particular limitation as long as this sensor can be used for the temperature measurement of this type. As an example of the temperature sensor 50, a thermocouple, a thermistor, or the like may be used. In the present embodiment, the temperature sensors 50 are attached to the region where the temperature is likely to be the highest inside the housing 40 and the region where the temperature is likely to be the lowest inside the housing 40. As described above, inside the housing 40, there is likely to occur such a temperature distribution that the center in the arrangement direction X has the highest temperature and the upstream side in the arrangement direction X has the lowest temperature. In this case, temperature sensors 50 may be attached to the submodule 10A on the most upstream side and to the submodule 10C at the center, respectively. Then, the respective temperature sensors 50 measure the temperatures of the submodules 10A, 10C, and transmit measurement results to a control unit described later.

The control unit typically includes a ROM (read only memory) storing a program for performing the constraining pressure control, a CPU (central processing unit) capable of executing the program, and a RAM (random access memory) temporarily storing data. Further, the control unit includes an input port to which a measurement result of the temperature sensor 50 is input, and an output port from which a drive signal is output to the constraining pressure changing mechanism (worm gear 36). This control unit changes the drive signal to the worm gear 36 based on the measurement result of the temperature sensor 50. Accordingly, the constraining pressure of each of the submodules 10A to 10E can be immediately changed in response to the variation in the temperature distribution inside the housing 40, so that the high-rate resistance of the entire battery module 1 can be more appropriately enhanced.

Further, distribution information indicating the tendency of the temperature distribution inside the housing 40 is recorded in the control unit in the present embodiment, and the control unit controls the constraining pressure changing mechanism (worm gear 36) based on the measurement result of the temperature sensor 50 and the distribution information. As described above, inside the housing 40 shown in FIG. 1 and FIG. 2, there is likely to occur such a temperature distribution that the center in the arrangement direction X has the highest temperature and the most upstream side in the arrangement direction X has the lowest temperature. The distribution information regarding the above temperature distribution is recorded in the control unit in advance, and by referring to this distribution information at the time of adjusting the constraining pressure, the constraining pressure can be more easily adjusted based on the temperature information even when the number of temperature sensors 50 is reduced. Therefore, it is possible to build up a battery module having a suitable high-rate resistance while reducing the number of parts and reducing the manufacturing cost. The distribution information to be recorded in the control unit can be obtained in advance through a preliminary experiment or the like. For example, in this preliminary experiment, a temperature sensor may be attached to each of the plurality of single cells housed in the housing so as to acquire a detailed temperature distribution at the time of the charging-discharging. With this configuration, it is possible to perform the constraining pressure adjustment more accurately.

2. Another Embodiment

As described above, one embodiment (the first embodiment) of the battery module disclosed herein has been described. However, the above-described first embodiment is not intended to limit the technology disclosed herein, and various changes can be made. Hereinafter, other embodiments of the battery module disclosed herein will be described.

(1) Control on Constraining Pressure

In the battery module 1 according to the first embodiment, distribution information indicating a temperature distribution inside the housing 40 is stored in the control unit, and the constraining pressure of each of the submodules 10A to 10E is adjusted based on the measurement result of the temperature sensor and the distribution information.

Figure 4:
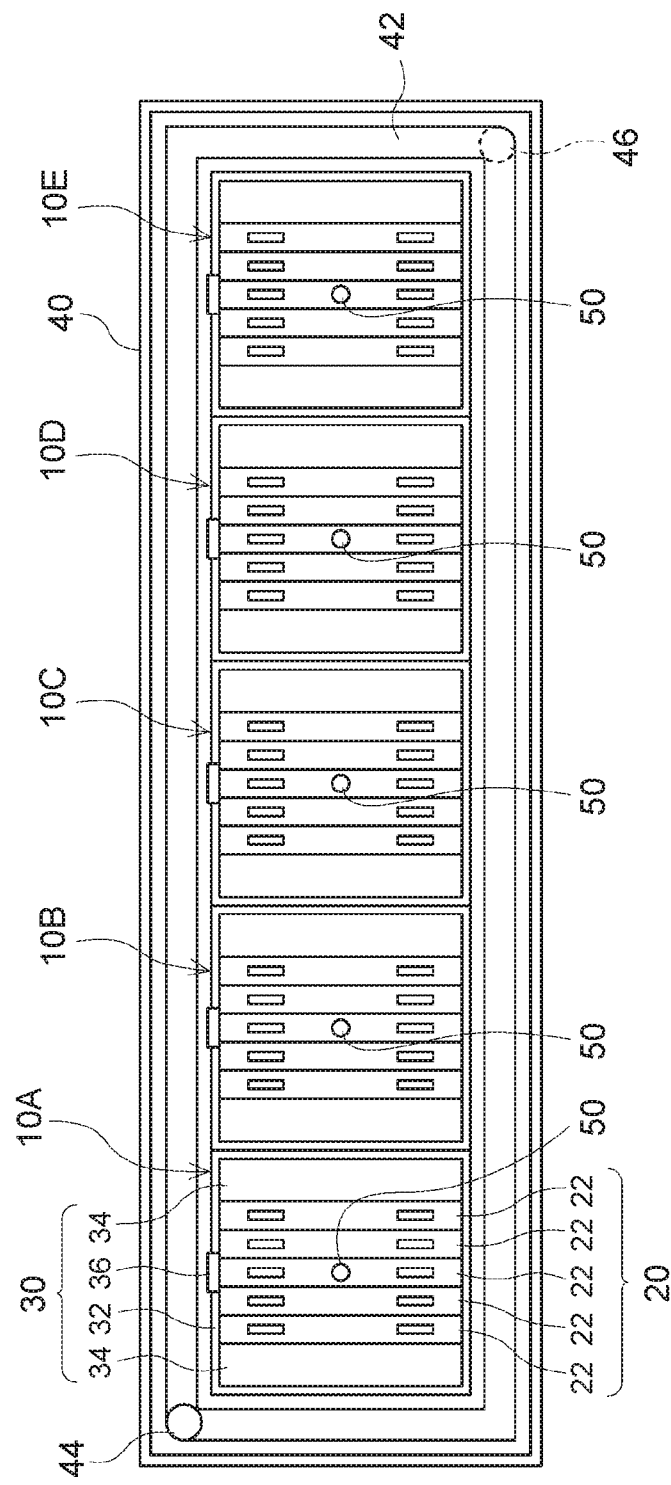
FIG. 4 is a plan view schematically showing a battery module according to another embodiment of the present disclosure.

However, even in the case in which the distribution information is not recorded in the control unit, the constraining pressure of each submodule can be appropriately adjusted based only on the measurement result of the temperature sensor. For example, by increasing the number of temperature sensors to an extent that allows an accurate grasp of the temperature distribution inside the housing, it is possible to accurately adjust the constraining pressure even when the distribution information is not recorded in the control unit. An example of this embodiment, as shown in FIG. 4, may include such a form of attaching a temperature sensor 50 to each of the submodules 10A to 10E in the housing 40.

The first embodiment includes a control unit that controls the constraining pressure of the constraining member 30 based on the measurement result of the temperature sensor 50. However, the battery module disclosed herein may not include the control unit. For example, when adopting a structure capable of manually operating the constraining pressure changing mechanism (such as the worm gear) from the outside of the housing and a display unit (such as an indicator) indicating the temperature distribution inside the housing, the constraining pressure of each submodule can be adjusted manually depending on the temperature distribution indicated on the display unit. Even when the above structure is adopted, it is possible to apply an appropriate constraining pressure depending on the temperature distribution to each of the submodules, to thus make the high-rate resistance for each single cell uniform at a high level.

Further, each of the above-described embodiments includes the constraining pressure changing mechanism capable of adjusting the constraining pressure of the submodule depending on the usage situation, but the technology disclosed herein is not limited to such a mode. For example, when the distribution information during the charging-discharging is known by conducting a preliminary experiment, the constraining pressure of each of the submodules may be set in advance depending on the distribution information. Even in this case, since the constraining pressure of the submodule arranged in the low-temperature region can be lowered, it is also possible to uniform the high-rate resistance among the single cells at a high level. However, from the viewpoint of immediately changing the constraining pressure of each submodule in response to the change in temperature distribution due to the charging-discharging so as to more appropriately promote enhancement of the high-rate resistance of the entire battery module, as with the above-described embodiment, the constraining pressure changing mechanism may be provided such that the constraining pressure changes depending on the usage situation.

(2) Temperature Distribution

The battery module 1 according to the first embodiment has a tendency to cause the temperature distribution in which the region at the center in the arrangement direction X has the highest temperature and the region on the most upstream side in the arrangement direction X has the lowest temperature. However, this temperature distribution is an example of the temperature distribution that can occur inside the housing of the battery module, and is not intended to limit the technology disclosed herein. Specifically, the temperature distribution inside the housing varies depending on various conditions such as the shape of the housing, the number of single cells, the charging-discharging conditions, the form of the cooling path, and others; therefore, in some instances they may be studied through a preliminary experiment or the like. For example, in the case of providing an inlet port of the cooling path near the center in the arrangement direction, the submodule at the center may be the coldest submodule. In this case, by setting the constraining pressure of the submodule at the center to be lower than those of the other submodules, it is possible to uniform the high-rate resistance of each of the plurality of single cells at a high level.

(3) Cooling Path

As described above, the battery module 1 according to the first embodiment supplies air outside the housing 40 into the cooling path 42 so as to cool the single cells 22. However, the form of the cooling path is not intended to limit the technology disclosed herein. For example, instead of air outside the housing, a cooling gas at approximately 0° C. to 25° C. may be supplied into the inside of the housing. Further, the technology disclosed herein can be applied to a water-cooled battery module in which single cells are cooled with a liquid-based coolant, other than these air-cooled battery modules. Specifically, as shown in FIG. 4, even in the case in which a jacket for retaining a liquid-based coolant such as water or a cooling agent therein is provided as the cooling path 42 inside the housing 40, variation in temperature may be caused inside the housing 40. In this case, by setting the constraining pressure of the submodule in the lowest-temperature region to be low, the high-rate resistance of each of the plurality of single cells 22 can be made uniform at a high level.

The structure for cooling the single cells (the cooling path, the inlet port, the outlet port, etc.) does not necessarily need to be formed inside the housing. For example, the single cells inside the housing can be cooled even in the case in which the housing that houses the plurality of submodules is sealed and the cooling path such as a jacket is attached to the outside of the housing. In the form of forming the cooling path outside the housing, it may be prudent to conduct a preliminary experiment to measure the temperature distribution inside the housing while cooling from the outside of the housing.

(4) Constraining Member

As described above, in the first embodiment, the constraining member 30 includes the constraining bands 32, and the tightening pressure of the constraining band 32 in the submodule 10A arranged in the region where the temperature is likely to be low is smaller than those in the other submodules 10B to 10E. However, the structure of the constraining member is not intended to limit the technology disclosed herein, and various structures can be adopted.

Figure 5:
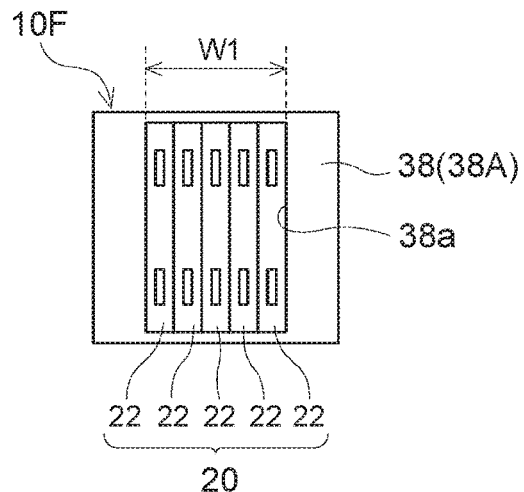
FIG. 5 is a plan view schematically showing a submodule in another embodiment of the present disclosure.
Figure 5:
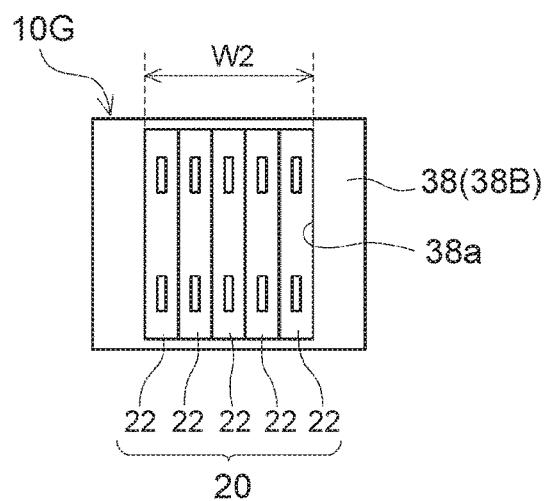

For example, when a space between the single cells in the submodule arranged in a region where the temperature is likely to be low is set to be larger than those in the other submodules, the constraining pressure of the submodule in the low-temperature region can be reduced so as to uniform the high-rate resistance at a high level. An example of the constraining member that realizes the above structure includes a frame body 38 as shown in FIG. 5. The single cells 22 tend to expand at the time of charging-discharging; thus, when the charging-discharging is performed in the state in which the plurality of single cells 22 is housed in a housing part 38a of the frame body 38, the constraining pressure occurs along the arrangement direction X due to expansion of the single cells 22. When the above-configured frame body 38 is used as the constraining member 30, in some embodiments two types of frame bodies 38A, 38B having respective different width dimensions W1, W2 of the housing part 38a, may be prepared. The submodule 10F using the frame body 38A having the housing part 38a with the larger width W1 is arranged in a low-temperature region, and the submodule 10G using the frame body 38B having the housing part 38a with the smaller width dimension W2 is arranged in a high-temperature region. With this configuration, a space between the single cells in the submodule arranged in the low-temperature region becomes larger than those in the other submodules, and thus the constraining pressure of the submodule in the low-temperature region can be reduced.

Figure 6:
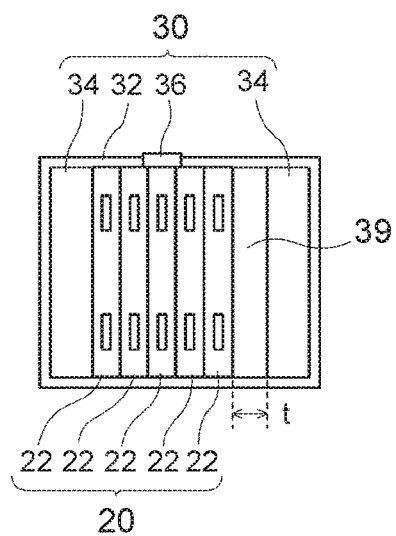
FIG. 6 is a plan view schematically showing a submodule in another embodiment of the present disclosure.

As shown in FIG. 6, each of the plurality of submodules may include a buffer plate 39 constrained together with the plurality of single cells 22 by the constraining member 30. In this case, the submodule arranged in the region where the temperature is likely to be low has a thickness t of the buffer plate 39 smaller than those in the other submodules. This configuration allows the constraining pressure of the submodule in the low-temperature region to be lower than those in the other submodules, and thus it is possible to uniform the high-rate resistance of each single cell 22 at a high level.

In the first embodiment, the worm gear 36 is used as the constraining pressure changing mechanism; however, the structure of the constraining pressure changing mechanism is not particularly limited as long as the constraining pressures of the constraining members for the plurality of submodules can be individually changed. For example, in the case of changing the constraining pressure by adjusting the tightening pressure of the constraining band, a driving device such as an actuator may be attached to the constraining band, instead of the worm gear. In the case of changing the constraining pressure by adjusting the thickness t of the buffer plate 39 shown in FIG. 6, the spring constant of the buffer plate 39 may be changed, or a piezo element that changes the thickness t of the buffer plate 39 may be used.

(5) Structure of Cell

As shown in FIG. 3, in the first embodiment, as the single cell 22, a rectangular cell having a flat rectangular battery case 26 is used. However, various types of structures and shapes may be adopted as long as the single cell has a pair of flat surfaces. For example, a laminate cell formed by housing a power generation element in a laminate film can be used as a single cell. Since such a laminate cell also has a pair of flat surfaces, a plurality of cells is arranged such that their flat surfaces face each other so as to form a cell group, and the cell group is restrained by the constraining member to be formed into a submodule.

In the first embodiment, the plurality of submodules 10A to 10E are arranged along the arrangement direction X of the single cells 22. However, when building up the battery module, it is unnecessary that the arrangement direction of the single cells coincides with the arrangement direction of the submodules; and depending on the usage of the battery module, the housing positions of the submodules inside the housing can be changed. For example, the plurality of submodules may be arranged in a direction perpendicular to the arrangement direction of the single cells. Further, submodules in two or more rows may be housed inside the housing. Even in the case of the battery module having such a structure, a high high-rate resistance can be exerted as a whole by reducing the constraining pressure of the submodule in the low-temperature region.

As described above, although the present disclosure has been described in detail with reference to the specific embodiments, these are merely examples, and do not limit the scope of the claims. The technology described in the claims includes various modifications and alterations of the embodiments described above.

What is claimed is:

1. A battery module comprising:
a plurality of submodules: and
a housing that houses the plurality of submodules at respective predetermined positions,
the plurality of submodules including:
a cell group in which single cells each having a pair of flat surfaces facing each other are arranged such that the flat surfaces of adjacent single cells face each other; and
a constraining member that exerts a constraining pressure in a direction in which the plurality of single cells is arranged so as to constrain the cell group,
wherein, inside the housing, there is a region where a temperature is likely to be relatively low when charging-discharging of the plurality of submodules is carried out, and among the plurality of submodules, a submodule arranged in the region where the temperature is likely to be low has a lower constraining pressure of the constraining member than constraining pressures in the other submodules such that the high-rate resistance of the plurality of single cells of the submodule in the region where the temperature is likely to be relatively low is increased to be higher than the other submodules in other regions thereby improving the uniformity of high-rate resistance of each of the plurality of single cells of the battery module.

2. The battery module according to claim 1, wherein:
inside the housing, there is a region where the temperature is likely to be relatively high when charging-discharging of the plurality of submodules is performed; and
among the plurality of submodules, a submodule arranged in the region where the temperature is likely to be high has a higher constraining pressure of the constraining member than constraining pressures in the other submodules.

3. The battery module according to claim 1, further comprising a constraining pressure changing mechanism that individually changes constraining pressures of the constraining member for the plurality of submodules.

4. The battery module according to claim 3, further comprising:
a temperature sensor that measures a temperature inside the housing; and
a control unit that controls the constraining pressure changing mechanism based on measurement results of the temperature sensor.

5. The battery module according to claim 4, wherein:
distribution information indicating a tendency of a temperature distribution inside the housing is recorded in the control unit; and
the control unit controls the constraining pressure changing mechanism based on the measurement results of the temperature sensor and the distribution information.

6. The battery module according to claim 5, wherein the temperature sensors are attached to a region where the temperature is likely to be the highest inside the housing and to a region where the temperature is likely to be the lowest inside the housing.

7. The battery module according to claim 4, wherein the temperature sensor is attached to each of the plurality of submodules.

8. The battery module according to claim 1, wherein:
the constraining member includes a constraining band that tightens and constrains the plurality of cells; and
the submodule arranged in a region where the temperature is likely to be low has a lower tightening pressure of the constraining band than tightening pressures in the other submodules.

9. The battery module according to claim 1, wherein the submodule arranged in the region where the temperature is likely to be low has a larger space among the single cells than spaces among the single cells in the other submodules.

10. The battery module according to claim 1, wherein:
each of the plurality of submodules includes a buffer plate constrained together with the plurality of cells by the constraining member; and
the submodule arranged in the region where the temperature is likely to be low has a thinner thickness of the buffer plate than thicknesses of the buffer plates in the other submodules.

11. A battery module according to claim 1, comprising:
a cooling path formed inside the housing so as to be adjacent to the plurality of submodules;
an inlet port supplying a coolant to the cooling path from the outside of the housing; and
an outlet port discharging the coolant from the cooling path to the outside of the housing.

* * * * *